INVENTOR
J. R. PIERCE
BY Harry C. Hart
ATTORNEY

INVENTOR
J. R. PIERCE
BY Harry C. Hart
ATTORNEY

Sept. 27, 1955    J. R. PIERCE    2,719,188

NON-SYNCHRONOUS TIME DIVISION MULTIPLEX TELEPHONE TRANSMISSION

Filed May 5, 1950    7 Sheets-Sheet 3

INVENTOR
J. R. PIERCE
BY Harry C. Hart
ATTORNEY

INVENTOR
J. R. PIERCE
BY Harry C. Hart
ATTORNEY

INVENTOR
J. R. PIERCE
BY Harry C. Hart
ATTORNEY

Sept. 27, 1955 J. R. PIERCE 2,719,188

NON-SYNCHRONOUS TIME DIVISION MULTIPLEX
TELEPHONE TRANSMISSION

Filed May 5, 1950 7 Sheets-Sheet 6

INVENTOR
J. R. PIERCE
BY Harry C. Hart
ATTORNEY

Sept. 27, 1955 J. R. PIERCE 2,719,188

NON-SYNCHRONOUS TIME DIVISION MULTIPLEX TELEPHONE TRANSMISSION

Filed May 5, 1950 7 Sheets-Sheet 7

INVENTOR
J. R. PIERCE
BY Harry C. Hart
ATTORNEY 2,719,188

NON-SYNCHRONOUS TIME DIVISION MULTIPLEX TELEPHONE TRANSMISSION

John R. Pierce, Millburn, N. J., assignor to Bell Telephone Laboratories, Incorporated, New York, N. Y., a corporation of New York Application May 5, 1950, Serial No. 160,113

17 Claims. (Cl. 179—15)

This invention relates to multiplex communication, and particularly to an improved time division multiplex system of elastic channel capacity.

Time division multiplex communication systems as they are presently known fall into one of three main classes. In the first class are fully synchronous systems in which, at a transmitter station, all of the incoming lines, e. g., telephone transmitters, are sampled in rotation; the samples are transmitted in time sequence over a common medium to a receiver station where they are distributed to the telephone receivers for which they are intended by a distributor which must operate in synchronism and in phase with the sampler. To avoid the complexities of the distributor apparatus at the receiver, systems have been proposed in which each speech sample itself bears an identifying label in the form of some distinguishing characteristic; i. e., the speech sample bears its own address. Sorting is then accomplished at the receiver station by way of suitable recognition apparatus, each receiver accepting only those speech samples which are intended for it and rejecting those intended for other receivers. Systems of this, the second class, may be termed semisynchronous.

Because of the fact that the several channels to be transmitted are sampled in cyclic serial order, the semisynchronous systems, like the fully synchronous ones, require that all of the transmitters which make up the system shall be interdependent, at least as far as sampling is concerned. On the transmission medium the pulses of the outgoing train fall into definite time slots. When all of the available time slots are occupied, the capacity of the system is filled, and temporary idleness of any particular time slot does not make it available to a transmitter other than the one to which it has been assigned.

In systems of the third or non-synchronous class, the transmitters need no longer be intercoupled by a central sampling agency but may be independent of one another except in so far as each transmitter must apply to the signal which it transmits some characteristic which uniquely identifies the receiver for which it is destined. Systems of this class have been proposed in which there is assigned to each of the several substations as the characteristic which identifies it a specific pulse rate, and any transmitter desiring to communicate with a receiver to which such pulse rate has been assigned must employ this pulse rate in transmitting. A sufficiently long sequence of the pulses of the outgoing train on the medium now bear their address in the form of this assigned pulsing frequency, while the information of the message is carried by some appropriate form of modulation. Such a system is more flexible as to channel capacity than are systems of the first or the second class, in that a new transmitter and a new receiver may be added at any time, as long as the new assigned pulse rate is within the carrying capacity of the transmission medium. On the other hand, such systems are extremely wasteful of frequency space, because a substantial separation is required between the pulse rates of adjacent channels. Were it not for this, there would be periods of a second or more during which the pulses of one channel would appear to have the same recurrence rate as the pulses of another channel, and the resulting interference between them would be intolerable.

The present invention deals with systems of the fully non-synchronous class, and has for its principal object the reduction of interchannel interference without resorting to the wasteful expedient of wide separation between adjacent channel frequencies. A closely related object is to provide for the transmission of a practically unlimited number of communications by time division multiplex on a fully elastic basis. It is a major feature of the invention that there is no definite upper limit to the capacity of the system. However great the number of simultaneous communications, none is ever frozen out. Rather, at times of peak load, all are degraded in quality, though not seriously, as by the introduction of a small amount of background noise, without cross-talk.

These objects of the invention are attained as follows: First, the message originating at each transmitter is sampled at a sequence of randomly recurring instants. Instead of a periodic pulse generator, a source of erratically timed pulses, e. g., a noise source, controls the sampling process, either directly or indirectly by time-modulating a periodic pulse source which in turn controls the sampling process. The time interval after which each sampling pulse follows its predecessor is, by and large, sufficiently short to meet the fundamental requirement of a time division multiplex system; i. e. not more than one-half the period of the highest signal frequency component to be transmitted. Nevertheless these time intervals are erratic, and the sampling pulses which they separate occur erratically though frequently. The erratic pulse sources of the several transmitters may be alike, or different. No substantial difference in the performance of the system follows from differences among these sources.

Now it is evident that no matter how many transmitters may be operating simultaneously, there are always randomly located intervals in the pulse train in which some of the randomly timed pulses of a new transmitter may be inserted. Thus, the system is indefinitely elastic in its capacity.

On the other hand, with several such sources transmitting together, it is equally evident that there will be times when the pulses of one coincide with those of another; and it is a subsidiary object of the invention to arrange at each receiver station that such coincidence will result only in degradation of the desired message and not in cross-talk with an undesired one.

To accommodate the pulses of a new transmitter it is evidently desirable to increase, as far as possible, the lengths of the intervals between the pulse groups of the train. Accordingly, a related object of the invention is to magnify the interpulse group intervals without correspondingly reducing the sampling rate. This object is attained by departing from the standard practice of associating each outgoing pulse group with a single sample. Instead, and at the cost of slightly increased complexity of the pulse groups themselves, the latter are associated with the message samples by pairs, by threes, by fours, etc. In the illustrative embodiment to be discussed below, each pulse group represents the amplitudes of three message samples, and as a result the intervals between successive pulse groups of any one transmitter station are nearly three times as long as they would be on the one-to-one basis.

This advantageous result is obtained at a price; and the price is that when, due to interpulse group interference a pulse group is lost to the receiver for which it is intended, the information lost is that contained in three message samples instead of one. In accordance with a further feature of the invention the resulting annoyance to the called party is reduced by providing that the message samples in question are not successive ones, but are spaced apart on the time scale and separated by other samples similarly associated with other outgoing pulse groups.

The outgoing pulse groups intended for a particular receiver may be given any desired identifying characteristic, but a pulse code, and particularly a pulse time code, is preferred. When the appropriately coded pulse group reaches the receiver, it is recognized as such, accepted, demodulated, and reproduced, while a differently coded pulse group is rejected. However, because of the random times of arrival of the various pulse groups at the receiver, the unwanted with the wanted, it may of course happen that the pulses of two unwanted groups may combine together or some of the pulses of an unwanted group may combine with some of the pulses of the wanted group to produce at the receiver a spurious pulse group having just the interpulse timing which characterizes the wanted pulse group. Therefore, if timing alone were relied upon as the sole measure of acceptability of a pulse group, this interference would result in cross-talk. But that such a combination should fortuitously result in a pulse group having not only the correct interpulse timing for acceptance but also have a preassigned amplitude distribution is such a remote possibility as to be virtually negligible.

It is a further object of the invention to provide means for minimizing the effect of the loss of a pulse group at the receiver because of overlap of two pulse groups from different transmitters. This is accomplished by holding the amplitude conveyed by one pulse group until it is replaced by a new accepted pulse group.

Subsidiary objects of the invention are, therefore, to provide pulse groups of such a character that fortuitous interference among them can under no practical circumstances cause confusion, and to provide receiver pulse group recognition apparatus which shall make full use of all characteristics of the wanted pulse group. This is accomplished, at the transmitter, by giving to the pulse group destined for a particular receiver (*a*) a preassigned number of pulses (*b*) spaced apart by preassigned time intervals (*c*) with a preassigned amplitude distribution among them, and at the receiver by restricting acceptance accordingly. It is a feature of the receiver apparatus that each pulse is treated as present only when the derivative of the pulse, regarded as a function of time, is zero.

The message itself may be imposed on the pulse groups in any desired fashion. Frequency modulation of a carrier of which the pulse is the envelope is preferred.

The invention will be fully apprehended by reference to the following detailed description of preferred embodiments thereof taken in connection with the appended drawings in which.

Figure 1:
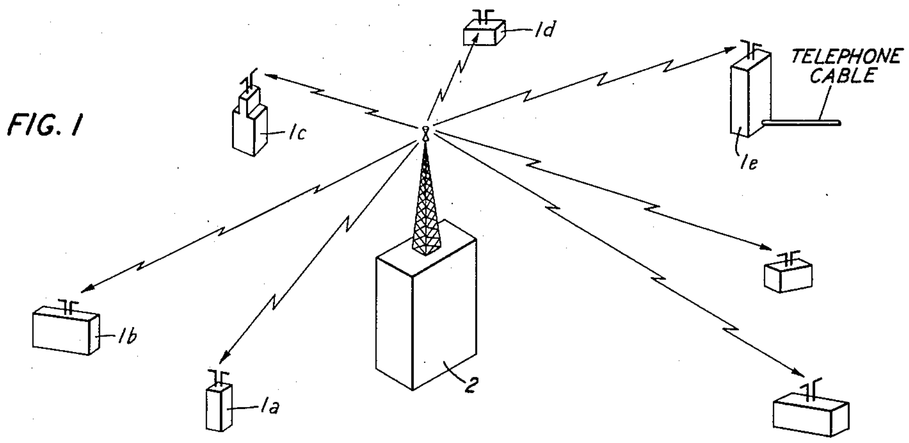
Fig. 1 is a pictorial representation showing the disposition of a plurality of telephone substations embodying the invention and a repeater station which is common to them.
Figures 2, 3:
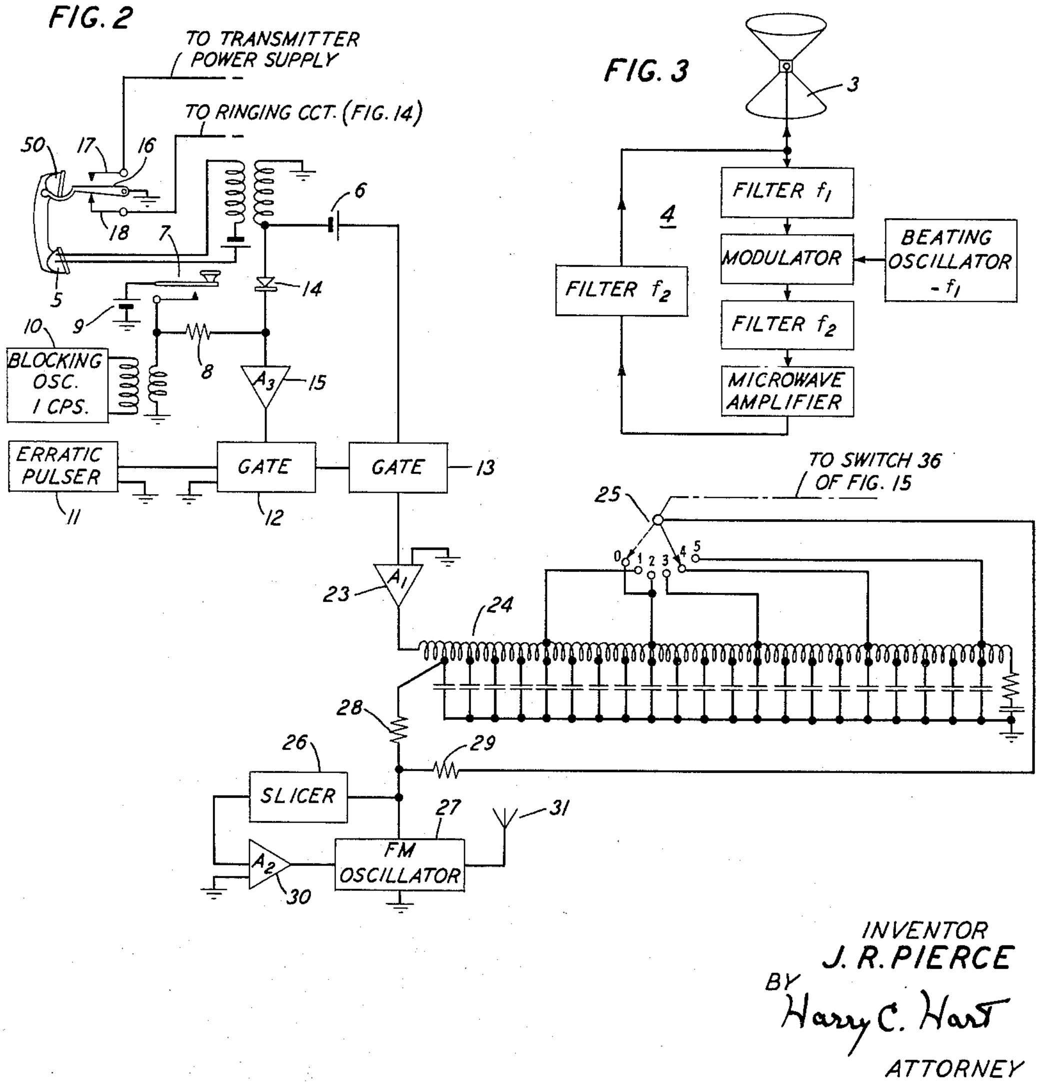
Fig. 2 is a schematic circuit diagram of transmitter apparatus embodied in any one of the substations of Fig. 1.
Fig. 3 is a schematic diagram of apparatus embodied in the central station of Fig. 1.

Referring now to the drawings, the invention contemplates a group of telephone substations, 1*a*, 1*b*, 1*c*, 1*d*, etc., the subscriber occupying any of which may wish to communicate with any other of the group, located, for example, in a rural community remote from conventional telephone facilities. Each of the substations may be provided with the transmitter apparatus of Fig. 2 and with the receiver apparatus of Fig. 14; or with the transmitter apparatus of Fig. 4 and the receiver apparatus of Fig. 15. Each of them is provided with a directional antenna which is pointed toward a central station, and all communications among the several parties located at the several substations are preferably carried on by way of a central frequency-changing repeater station 2. Each of the parties 1*a*, 1*b*, 1*c*, etc., may transmit to the repeater station 2 on a carrier frequency $f_1$ and receive from the central repeater station 2 on a carrier frequency $f_2$, in which case the central repeater station may be provided with an antenna which is preferably directional in the vertical plane but non-directional in the horizontal plane, for example a biconical antenna 3. The frequency-changing apparatus 4, as shown in Fig. 3, may comprise a filter, a beating oscillator and a modulator connected among themselves and to the antenna 3 in the manner shown. A signal received from any one of the substations 1*a*, 1*b*, 1*c*, etc., in the form of modulations on a carrrier frequency $f_1$, is selected by the first filter and, by means of a modulator and a beating oscillator, which may generate a voltage of frequency $f_2—f_1$, is reduced to the frequency $f_2$ without loss of its modulation. This new carrier $f_2$ is then filtered to remove modulation products, raised in its level as by an amplifier, again purified as by another filter, and delivered to the biconical antenna 3 which then broadcasts it to all of the substations of the system for reception by the one for which it is destined.

The transmitter apparatus contained in each of the substations may be identical with that contained in all of the others of the group, with exception of those features which are associated with the identification of that substation; i. e., its "telephone number." This apparatus will be discussed, by way of example, as that of substation No. 2. This substation is provided with a telephone handset comprising a microphone 5 and a telephone receiver 50, a ringing key 7, a source of erratic pulses 11, a delay line 24 having a plurality of taps connected respectively to the several contact points of a selector switch 25, a carrier frequency generator 27, and a transmitting antenna 31, interconnected in the manner shown, as well as supplementary amplifiers, coincidence gates, and the like. The significance of the circuit connections will be best understood from a description of the manner in which the system operates when party No. 2 calls party No. 4. The description follows.

Figures 5, 6:
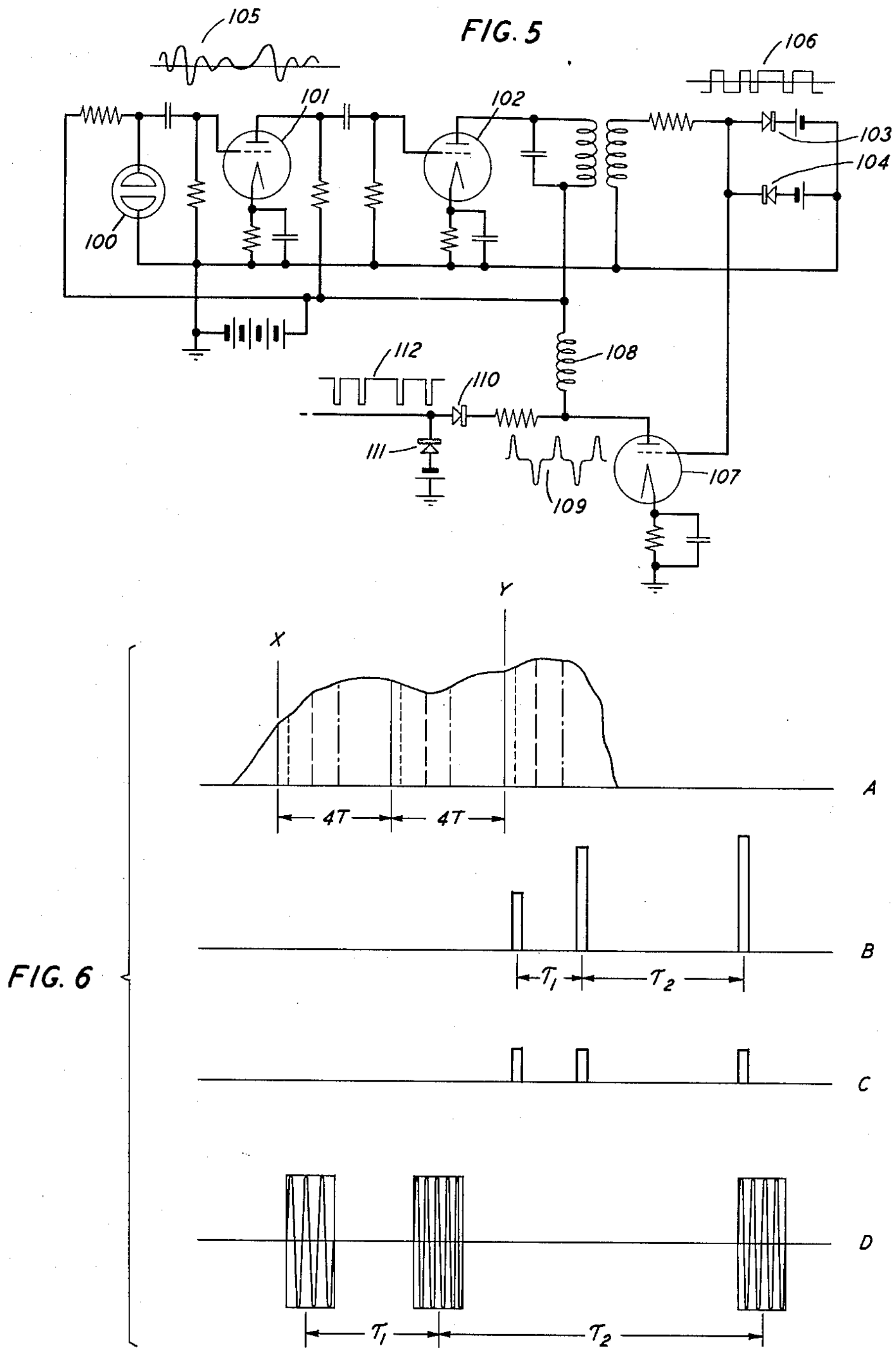
Fig. 5 is a circuit diagram showing the constructional details of an erratic pulse source for use in the transmitter of Fig. 2 or of Fig. 4.
Fig. 6 is a group of wave form diagrams of assistance in explaining the operation of the invention.
Figure 7:
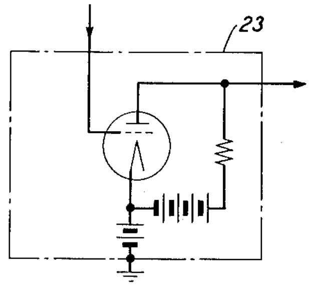
Figs. 7 through 12 are circuit diagrams showing various apparatus details.
Figure 9:
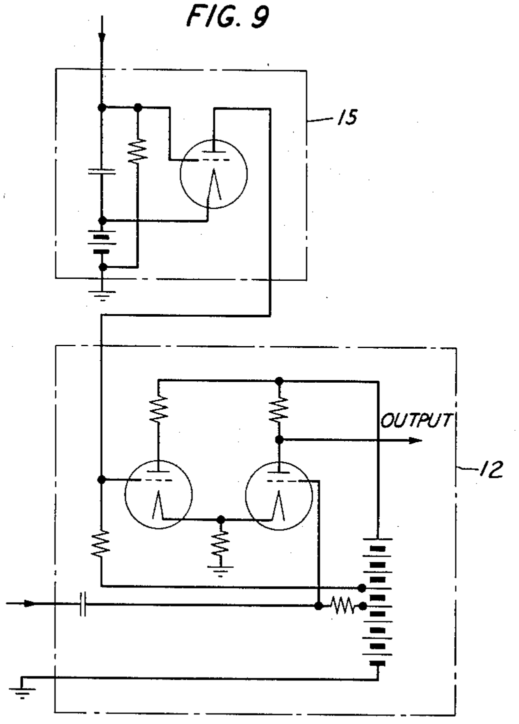
Figure 10:
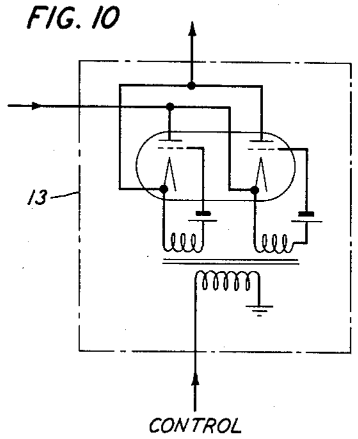

When the handset is on the hook 16 an upper contact 17 is open which deenergizes the power supply for the transmitter apparatus, and a lower contact 18 is closed which energizes a ringing circuit at the receiver apparatus, which will be described hereafter. In operation, when the party at substation No. 2 wishes to make a call, he first sets the arm of his selector switch 25 on the fourth contact point to identify the called party. He then lifts his handset off the hook 16, presses his ringing key 7, and speaks into his microphone 5. The electrical speech wave appears at the output terminals of the microphone transformer and is applied, in series with a battery 6, to a gate 13, whose constructional details may be as shown in Fig. 10 or otherwise as desired. No voice path, however, is established through the gate 13 until this gate is actuated by the output of a gate 12 which is in turn controlled by the erratically spaced pulses of the source 11, whose constructional details are shown in Fig. 5, and by the output of an amplifier 15 whose constructional details are shown in Fig. 9. The speech signal, if any, delivered by the microphone 5 is rectified by a rectifier 14 and applied to the control grid of a triode contained in the amplifier 15, which control grid is normally biased below cut-off as by a battery. This rectified speech signal suffices to overpower the bias, whereupon the amplifier 15 delivers its output to the gate 12. Thus the gate 12 is not actuated unless a talk spurt is in progress. However, it may also be actuated by depression of the ringing key 7 which operates to apply the voltage of a battery 9 to the grid of the triode of amplifier 15 and this acts in the same way to open the gate 12; i. e., to establish a path through this gate for the erratic pulses of the source 11 to the gate 13.

Gate 12 itself may be as shown in the lower part of Fig. 9, where the left-hand tube is normally conductive and the right-hand tube is normally biased to cut-off, these conditions being maintained by appropriate selection of the magnitudes of the resistors connected in the manner shown, and of the grid biases. Negative pulses are applied from the source 11 to the grid of the right-hand tube, but these are ineffectual in view of the negative bias on the grid of this tube, in the absence of a signal from the amplifier 15. However, when the amplifier 15 is rendered conductive either by depression of the ringing key 7 or by reason of the appearance of a speech wave on the output terminals of the microphone transformer, the resulting voltage drop across the plate load resistor of the triode of the amplifier 15 acts to bias the grid of the left-hand tube negatively, so that this tube is cut off and the discharge through it is transferred to the right-hand tube. Under this condition each negative pulse reaching the grid of the right-hand tube from the erratic pulse source 11 is amplified, providing a positive output pulse on its plate load resistor. This is applied by way of a transformer to the control terminal of the gate 13. The transformer windings are so poled as to apply a positive pulse to the grid of such tubes with respect to its cathode. As a result there is established a path through this gate, and by way of an amplifier 23, to the delay line 24. Inasmuch as this path is established through the gate 13 only during the very brief interval occupied by a single pulse of the erratic pulse source 11, the energy thus applied to the delay line 24 is in effect a sample of the speech wave amplitude. On the other hand, in the absence of speech, depression of the key 7 causes the gate 13 to take, in the same way, a sample of the voltage of the battery 6.

The delay line 24 may be of any desired type but a convenient one comprises an electromagnetic transmission line which is either uniformly loaded or lump-loaded to reduce its propagation speed to a small fraction of the speed of light. It is preferably a broad band line in order that the pulses which enter it at the left end shall not be degraded in traveling to the right end. The line may be terminated to prevent reflection at its far end in well-known manner.

This delay line 24 is provided with a plurality of taps at points spaced along its length and each of these taps is brought to one of the contact points of a selector switch 25. One of these taps, in the case of party No. 2 the second tap, is permanently connected to the zero contact point with which the movable arm of the switch 25 is connected when in the "receive" position, indicated by the broken line. The movable arm of the selector switch 25 is connected by the way of a resistor 29 to the frequency control terminal of an oscillator 27. The input end of the line 24 is also connected by way of a resistor 28 to the frequency control terminal of this oscillator 27. The same point is further connected by way of a slicer 26 and an amplifier 30 to the energizing terminal of the oscillator 27.

Figure 11:
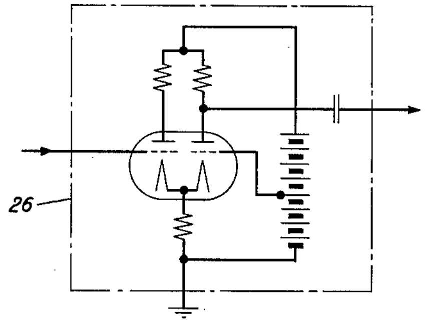
Figure 12:
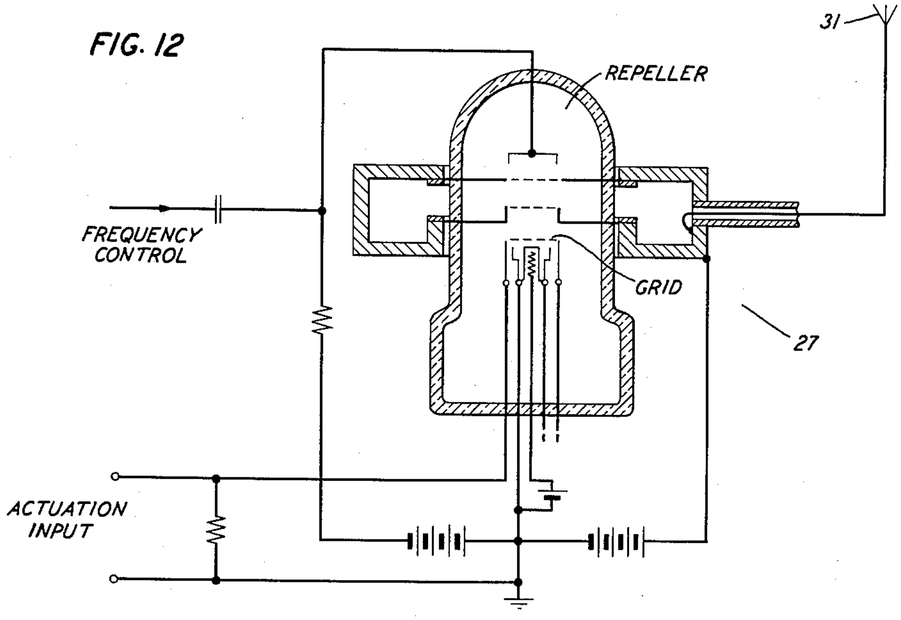

The oscillator 27 may take any of a variety of forms, a convenient one being a reflex oscillator as shown in Fig. 12, wherein high frequency oscillations are maintained at a mean frequency $f_1$ in a tuned cavity resonator from which the output of the oscillator may be taken and applied to an antenna 31. Oscillations are maintained by means of an electron flow which is reflected by the retarding field of a repeller electrode which is negatively biased with respect to the cathode of the tube. No oscillations take place until the electron stream flows from the cathode toward the anode, and the flow of this electron stream is normally prevented by a negative bias on the grid of the tube. The stream is then turned on by application of a positive bias to this grid, derived from the voice signal sample applied to the head end of the delay line 24 after being adjusted to a standard level by a slicer 26 whose circuit details may be as shown in Fig. 11. Thus, the reflex oscillator is turned on by the mere presence of a pulse entering the delay line 24, and delivers a brief spurt of high frequency energy to the antenna 31. At the same time, by way of the resistor 28, this pulse is applied without slicing to the repeller electrode of the oscillator. Inasmuch as the frequency of such an oscillator depends on the instantaneous voltage of the repeller electrode, the generated oscillation frequency is modulated by the magnitude of the signal sample as it enters the delay line 24.

This signal sample now travels down the delay line, passing the several taps in serial order. As it passes the fourth tap, it is picked up by the movable arm of the selector switch 25 which, in the "transmit" position, as shown by the solid line on the drawing, makes contact with this tap. The signal sample as thus picked up is applied by way of the resistor 29 to turn on the oscillation generator 27 in the manner described above and to adjust its oscillation frequency. The oscillation generator 27 then delivers a second brief spurt of high frequency energy to the antenna 31. Apart from attenuation due to the progress of the signal sample pulse down the delay line 24, which attenuation may be compensated in any of a variety of ways, the magnitude of the second pulse which is now applied by way of the resistor 29 to control the frequency of the oscillation generator is the same as the magnitude of the pulse which was earlier applied by way of the resistor 28. As a result, the frequencies of the two energy spurts thus delivered by the oscillation generator to the antenna 31 are alike, and are uniquely correlated with the amplitude of the message signal sample. Furthermore, the two spurts are spaced apart in time by an interval which is uniquely correlated with the length of the delay line 24 between its input terminal and the particular tap to which the movable arm of the selector switch 25 has been set, in this case tap No. 4.

Figure 14:
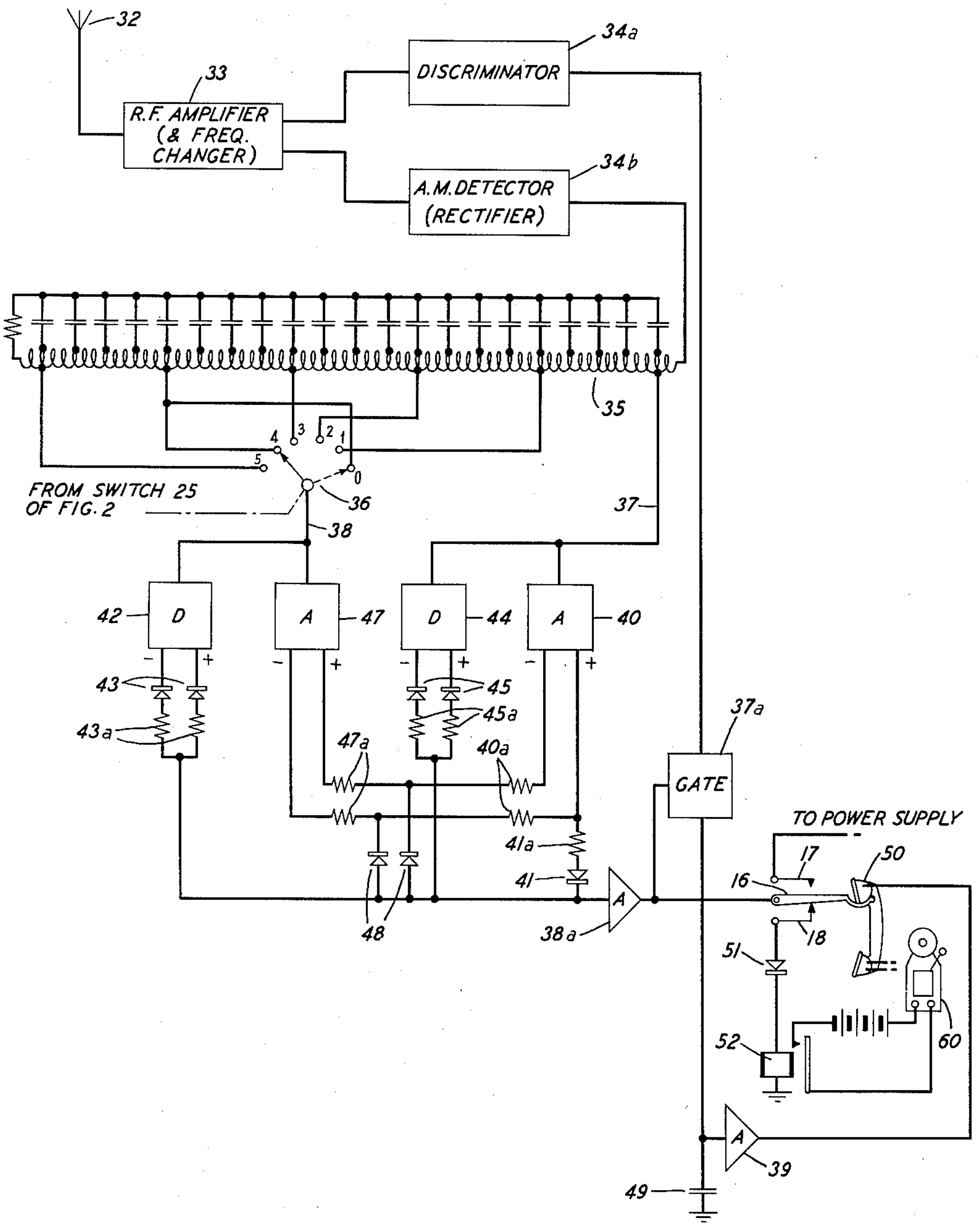
Fig. 14 is a schematic circuit diagram showing receiver apparatus which may be embodied in the same substation as the transmitter apparatus of Fig. 2.

By reason of the setting of the contact arm of the switch 25 on the contact point connected to tap No. 4 of the delay line 24, the message signal sample that is generated and transmitted in the manner described above is intended for party No. 4 at substation No. 4 of the system. Therefore, the receiver apparatus, which differs from substation to substation only by virtue of the station-identifying features and is illustrated in Fig. 14, will be described in connection with substation No. 4. Each receiver is provided with an antenna 32 which picks up energy broadcast by the central station 2 on the mean frequency $f_2$ to all the substations 1*a*, 1*b*, 1*c*, etc. The energy thus picked up by the antenna 32 passes through a double detection radio frequency amplifier 33 in which the incoming radio frequency $f_2$ may be changed to an intermediate frequency. This amplifier delivers its output, by way of two parallel paths, to a discriminator 34*a* and to an amplitude modulation detector or rectifier 34*b* respectively. These apparatus elements may be conventional. The output of the discriminator 34*a* is applied to a gate 37*a* which is controlled in the manner to be described. The output of the amplitude modulation detector 34*b* is applied to a delay line 35 which may be identical in construction with the delay line 24 of Fig. 2 and which is similarly provided with a like number of taps spaced along its length. One of these taps is identified with each substation. Thus, in the example being described, the fourth tap is identified with substation No. 4, and as indicated on the drawing, this tap makes connection not only with the No. 4 contact point but also with a "zero" contact point to which the arm of the switch 36 in its dotted position makes contact. The delay line tap to which the zero position contact point of the selector switch is connected differs from station to station.

Figures 13A, 13B:
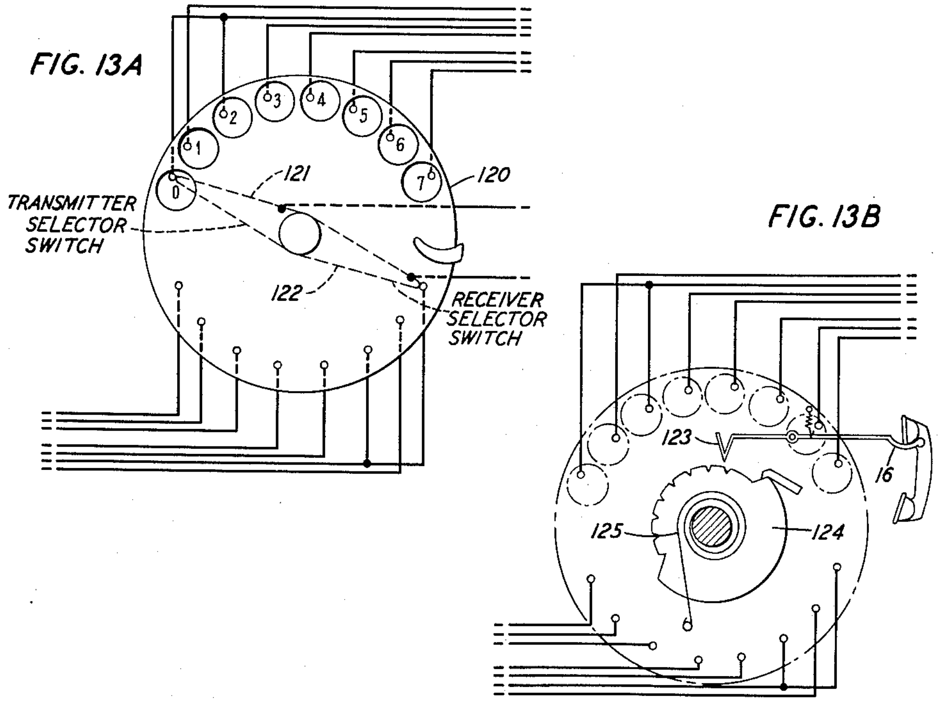
Figs. 13A and 13B show the constructional details of a selector switch for the transmitter of Fig. 2 and the receiver of Fig. 14.

Referring to Figs. 13A and 13B the selector switch for each substation may conveniently embody the transmitter switch 25 and the receiver switch 36 in the same apparatus unit. A finger-operated dial 120 turns both of the contact arms 121, 122, together to one or other of the contact points on each switch, and, on removal of the finger from the dial, the contact arms remain in position under the influence of a detent 123 which engages the teeth of a cam 124 which rotates with the dial 120. When the handset is placed on the hook 16, the detent 123 is lifted away from the teeth of the cam 124 and the cam, dial and contact arms are returned together under the action of a spring 125 to the zero position. This zero position is that under which calls destined for a particular receiver and appropriately coded as described above will be selected by that receiver and will operate to ring its telephone bell in the manner to be described. Thus, when the finger is removed from the dial and the handset is placed on its hook, the mechanism of Figs. 13A and 13B allows the contact of the switch 36 to return to its zero position where it makes connection with the fourth tap on the delay line 35. The received pulses, after rectification by the detector 34*b*, are applied to the head end of the receiver delay line 35 which here is the right-hand end, and travel along it, passing the several taps in serial order. Because of the fact that the delay line 35 is identical with the delay line 24, as the first of the two pulses generated by the apparatus of Fig. 2 reaches the fourth tap of the delay line 35, the second of the two pulses is just about to start its travel along the delay line 35. Thus, there are produced on the lead 38 which is connected to the contact arm of the selector switch 36 and on the lead 37 which is connected to the input end of the delay line 35 two simultaneous pulses of like amplitude. This will occur, however, only if the pulses as generated by the apparatus of Fig. 2 are spaced apart by the proper time interval which is equal to the time delay for such pulses between the head end of the receiver delay line 35 and the No. 4 tap of this delay line. Under any other condition of spacing between the pulses as generated, energy will not appear simultaneously on the lead 37 and on the lead 38 but will appear on one of these leads before it appears on the other.

An amplifier 40 is connected to the lead 37 and an amplifier 47 is connected to the lead 38. The output terminals of these two amplifiers are connected together in opposition by way of resistors 40*a*, 47*a*, and rectifiers 48 are connected in the manner shown between the two amplifier terminals and the input terminal to a gate-actuating amplifier 38*a*. If energy appears on the leads 37 and 38 simultaneously and in equal magnitude, the outputs of these two amplifiers 40 and 47 are balanced at all times and no signal succeeds in passing either one of the rectifiers 48. Under any other condition, either unlike amplitudes of the incoming pulses, or incorrect duration of the time interval which separates them, one or the other of the two rectifiers 48 provides a negative bias which overrides any positive bias otherwise applied to the amplifier 38*a*, for example, by way of a rectifier 41.

As a further protection against the acceptance of message signal samples not intended for the receiver at substation No. 4, the energy appearing on the lead 37 is differentiated by a differentiator 44 while the energy appearing on the lead 38 is differentiated by a differentiator 42. Each of these differentiators is provided with a balanced output circuit, to each side of which is connected a rectifier 43 or 45 and a resistor 43*a* or 45*a*. If the time derivative of the pulse on the lead 38 is not zero, one or other of the rectifiers 43 becomes conductive and a negative bias is delivered to the input terminals of the amplifier 38*a* of magnitude sufficient to disable it. Similarly, if the time derivative of the pulse on the lead 37 is not zero, a disabling negative bias is delivered by one or other of the rectifiers 45 to the input terminals of the amplifier 38*a*. Only if the time derivatives of both of these pulses are zero are the differentiators 40, 42 and the rectifiers 43, 45 of no effect in disabling the amplifier 38*a*. However, under the special condition that the derivatives of both of the pulses are zero; and, as above described, that this condition occurs at the instant at which the two pulses are of equal amplitude and appear simultaneously on the leads 37 and 38, then no overriding disabling bias is applied to the amplifier 38*a* and the first of the two pulses to be received, which is applied by way of a resistor 41*a* and a rectifier 41 to the amplifier 38*a* operates to enable this amplifier.

Figure 8:
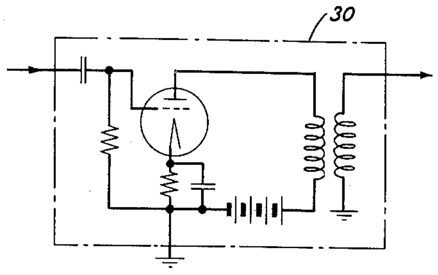

The constructional details of the amplifier 38*a* may be as shown in Fig. 8. When it is enabled by a positive pulse applied to its input, a signal is applied by way of its output transformer to the control terminals of the gate 37*a*, whose constructional details may be as shown in Fig. 10. The transformers are so poled that the signal drives the grids of the tubes in Fig. 10 momentarily positive. Actuation of the gate 37*a* in this manner momentarily establishes a path from the discriminator 34*a* to a holding condenser 49.

The condenser 49 holds its charge until another impulse is applied to it, whereupon it adopts the potential determined by this new impulse. The holding action is of especial significance in the present system, for if through interference a sample is masked or not received, or for any other reason not accepted, the held previous sample is retained rather than being replaced by zero amplitude. By virtue of the construction of the discriminator 34*a*, it operates to convert the signal-modulated frequency of the incoming energy spurt into an amplitude which is proportional to the message signal sample being transmitted, and this message signal sample is thus applied by way of an amplifier 39 to the telephone receiver 50. However, during the ringing process no voice signal is being transmitted from substation No. 2 but rather a ringing signal due to depression of the key 7. Furthermore, the handset of the party at substation No. 4 is on its hook 16. By way of the lower hook contact 18 this establishes a path by way of a rectifier 51 and a relay 52 to ground, so that when the amplifier 38*a* is enabled, its output passes to ground by way of the relay 52 and energizes this relay. Energizing of the relay 52 completes a circuit through a battery and a bell 60 which then rings, calling the attention of party No. 4 to the fact that he is wanted on the telephone. He then picks up his handset, opening the ringing circuit contact 18 and, by way of the upper contact 17, establishing the circuit of his transmitter power supply. He does not have to operate his selector switches 25, 36 because they are already connected to tap No. 4, to which the movable arm of the transmitter selector switch 25 at substation No. 2 is also connected. By reason of the mechanical connection of the switches 25 and 36 at station No. 2, the calling party can also receive, without dialing, the conversation of the called party. Thus the necessary equality of the delays on the delay lines 24 and 35 at both substations between the head end and the particular tap under consideration has been established for a two-way conversation.

In the system as above described, each two-way conversation between two parties takes place in complete independence of any other two-way conversation which may simultaneously be taking place between two other parties. There is no synchronization between any of the operations at any station and any operation at any other station, and yet independence of the conversations is completely maintained as though individual wires interconnected the stations by way of a central office; and this despite the fact that the system employs neither wire separation nor frequency separation but merely separation by the coding of the call numbers.

Because of the random nature of the sampling process, which is carried out under control of the erratic pulse source 11, there is with the present system no definite upper limit to the number of simultaneous conversations which are possible. As more and more substations become active, it is of course true that more and more pulse groups reach each receiver; and as the number of different pulse groups reaching each receiver increases, so the possibility of fortuitous reception and acceptance of a pulse group which is not intended for a particular receiver increases. Furthermore, the possibility also increases of the arrival at the input terminals of a receiver of a false pulse group composed of a pair of pulses only one of which, or indeed neither of which, is intended for the receiver in question, but which are nevertheless separated by the exactly correct time interval to permit the energy to enter the leads 37 and 38 from the delay line 35 simultaneously. However, the likelihood of this event also being accompanied by equal amplitudes of both of the pulses and by zero values for the time derivatives for both of them is exceedingly remote. Therefore, the occurrence of a pair of properly spaced pulses which fail to meet all requirements imposed by the receiver apparatus holds the amplifier 38*a* in disabled condition. Thus, if a pulse pair destined for a particular receiver is masked by other pulses, the result is not cross-talk but merely rejection by the receiver of this particular pulse pair and therefore of the message signal sample which it carries, the sample carried by the last-received pair being held by the condenser 49 until a new pair is accepted.

In short, the effect of adding more subscribers to the medium is not cross-talk but merely degradation in the quality of the received speech of each subscriber, which degradation endures only during the time in which the system is heavily loaded, and which degradation is minimized by the holding of each sample, not for a constant time, but until the unpredictable time at which a new sample is received.

Still another feature of the system is that it permits more than two parties to engage in conversation. Thus, suppose that party A and party B are already in communication with each other, party A having called party B by moving his selector switch 25 to the tap of his transmitting delay line 24 corresponding to the zero contact point of party B's receiver delay line 35. Party A and party B are talking to each other over the channel identified by party B's pulse delay. Suppose, now, that party C also wishes to call party B, in ignorance of the fact that B is already talking with A. Party C calls party B in the manner described above. Now the time delays of the transmitter and receiver apparatus of A, B, and C are all adjusted to the same value and all three parties can talk together. Similarly, a fourth party can come into the conversation or, indeed, any number whatsoever.

In order that the parties 1*a*, 1*b*, 1*c* etc., may enter into communication with parties who are not members of the group, one of the substations, for example the substation 1*e*, may be a conventional telephone exchange, as well as being provided with the apparatus of the present invention. The calling party then establishes a voice path with the operator in station 1*e* in the manner described above, and gives her the number of the called party. She then plugs a line on which the incoming call appears into the called party's jack, and the call proceeds in the conventional manner.

To provide a supervisory signal by which the operator may know that the calling party's handset has been removed from his hook 16, even during pauses in the conversation, each substation of the system may be provided with an auxiliary source, for example a blocking oscillator 10 (Fig. 2) which may be set in operation, along with the other transmitter apparatus, by closure of the hook contact 17. When in operation it may deliver pulses, for example at a rate of one pulse per second, to the resistor 8, thus stimulating a succession of momentary closures of the key 7, and so sending a ringing signal once per second. This may be employed to flash a light at the switchboard of the operator in substation 1*e*.

This arrangement has the further advantage that the key 7 may now be dispensed with, since the ringing of the bell 60 at the called party's substation now takes place automatically, once per second, when the calling party has lifted his handset from its hook 16.

Figure 4:
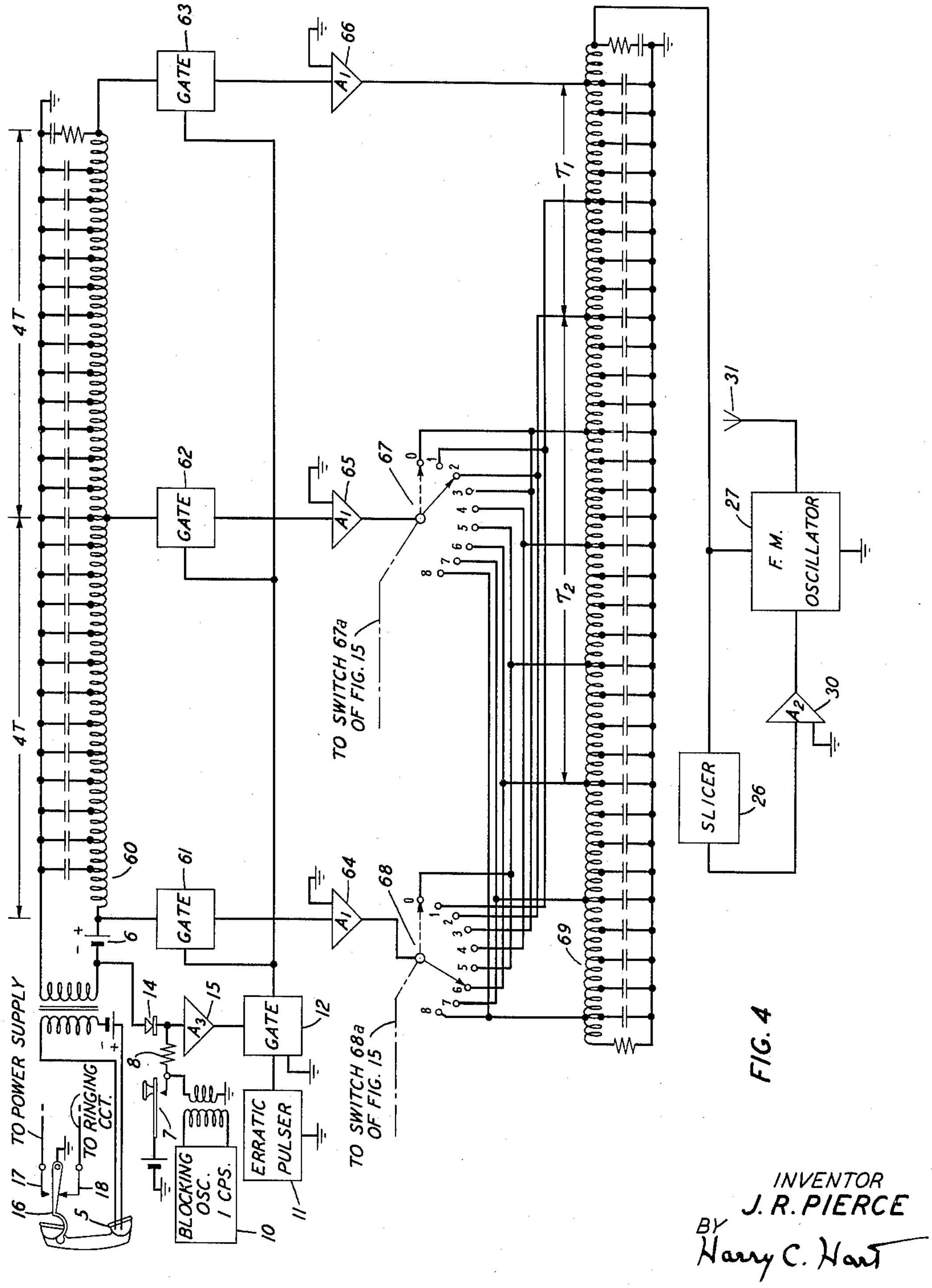
Fig. 4 is a schematic circuit diagram of a refined alternative to the transmitter apparatus of Fig. 2.
Figure 15:
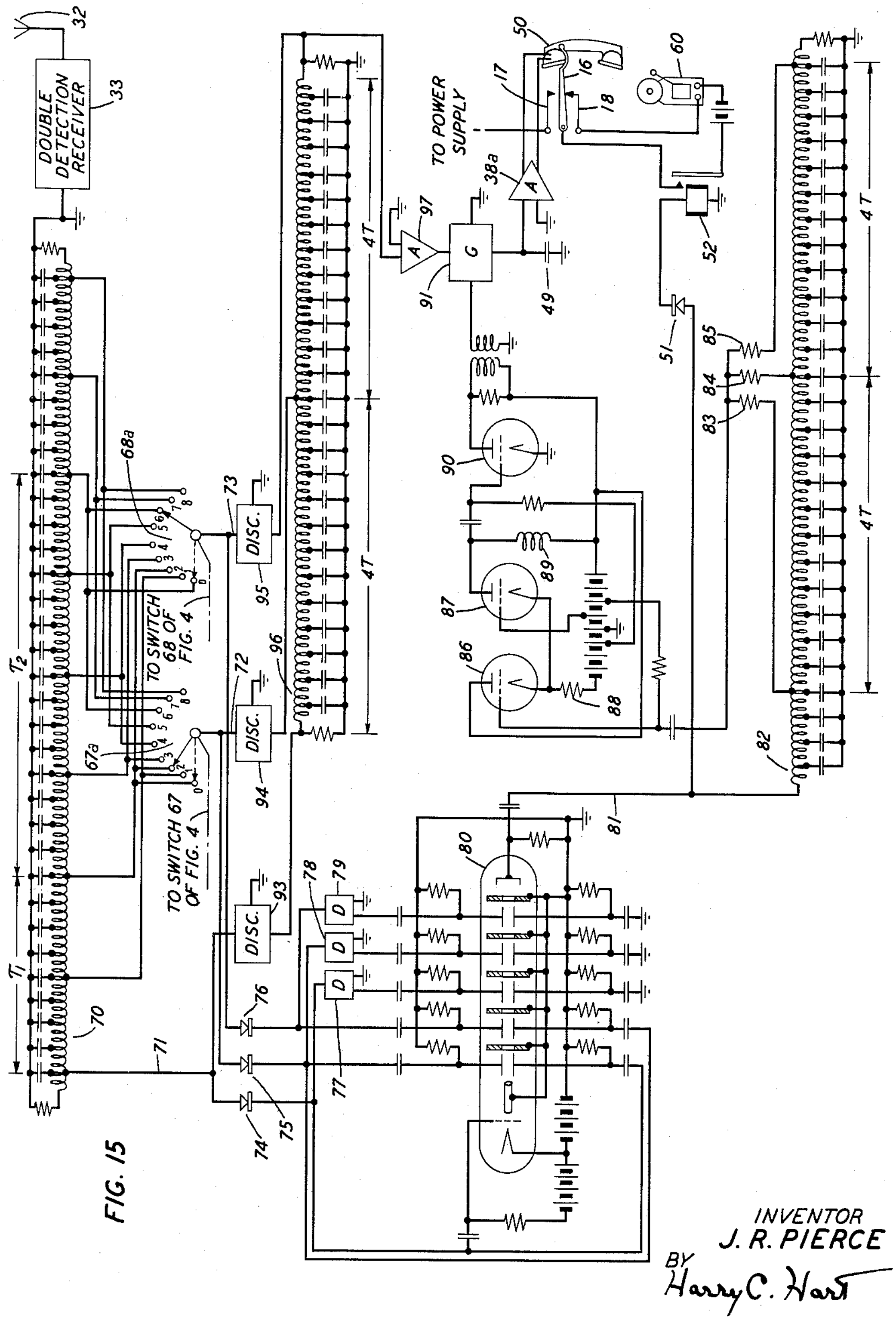
Fig. 15 is a schematic circuit diagram showing the details of a refined alternative to the receiver of Fig. 14, which may be embodied in the same substation as the transmitter apparatus of Fig. 4.

Figs. 4 and 15 show, for transmitter and for receiver, respectively, more refined apparatus in accordance with invention. In the system of Figs. 2 and 14, each message signal sample was carried by a pair of transmitted pulses, the pulse spacing identifying the called party and the transmitted instantaneous frequency of which the pulse forms the envelope being the same for both pulses and being correlated with the message signal sample amplitude. In the system of Figs. 4 and 15, the pulse group comprises three pulses, spaced apart by two time intervals which are individually specified for each called party. Furthermore, each group of three transmitted pulses carries the information contained in three speech samples. The three speech samples whose information is carried by the pulse group are preferably not three successive speech samples but are spaced apart in time along the speech wave.

Referring now to Fig. 4, the handset 5, the ringing key 7, the blocking oscillator 10, the erratic pulser 11, and the gate 12 may be identical with those of Fig. 2. Likewise, the delay line 69 may be similar to the delay line 24 in Fig. 2. Now, however, it is terminated for no reflection at both ends and is provided with a greater number of taps, and these taps are multipled to two selector switches 67 and 68, each of which is mechanically coupled or ganged to a corresponding receiver selector switch in the receiver apparatus at the same substation. Instead, however, of the gate 13 in Fig. 2, which takes signal samples of the speech wave appearing on the output terminals of the microphone transformer, there are now three similar gates 61, 62, and 63 connected to spaced points along a message signal delay line 60. The total delay from one end to the other of the delay line 60 is 8T, where T is the average value of the time interval between speech samples. Thus, in conventional time division multiplex systems which undertake to transmit voice frequencies up to about 4,000 cycles per second, it is known that, for high quality reproduction, the sampling frequency should be 8,000 cycles per second or more. In this example, the value of the period T is then $\frac{1}{8000}$ second.

The gates 61, 62, and 63, whose constructional details may be as shown in Fig. 10, are connected to the head end, the mid-point, and the far end of the delay line 60, which is terminated for no reflection in the usual manner.

When a party speaks into his microphone 5, the speech wave travels from the left end of the delay line 60 to the right end, and at a certain instant the portion of this wave which has reached the far end has one magnitude, the portion which has reached the mid-point has another magnitude, and the portion just starting its progress down the delay line has a third magnitude. These three magnitudes can be regarded as three different potential speech wave samples which are spaced apart in time by the interval 4T.

The presence of speech on the output terminals of the microphone transformer operates through the rectifier 14 and the amplifier 15 to enable the gate 12 in the manner described above in connection with the apparatus of Fig. 2. This permits the successive pulses of the erratic pulse source 11 to pass through the gate 12 and enable the gates 61, 62, and 63 simultaneously and together. Thus, a single pulse from the erratic pulse source 11 operates to derive and actualize these three spaced speech wave samples and to apply them to the amplifiers 64, 65, and 66, the earliest sample being applied to the amplifier 66 and the latest of the three to the amplifier 64.

The transmitter is provided with two selector switches 67 and 68, of which the contact points are mutipled to the several taps of the delay line 69. In the example shown, the zero contact point of the switch 67 is permanently connected to tap No. 3 of the same switch, while the zero contact point of the switch 68 is permanently connected to tap No. 5 of the same switch. The switch construction may be as shown in Figs. 13A and 13B for each of these switches, switch 67 being mechanically connected or ganged to switch **67*a* in the receiver apparatus of Fig. 15 and switch 68 being mechanically connected to switch 68*a*** in the receiver apparatus. In the example shown, the contact arms of the two switches are shown in broken lines as lying on the zero contact points of these switches, i. e., they are in position to receive a call intended for the particular party whose transmitter apparatus is here shown and whose telephone number, from the arrangement of the connections on the switches, is evidently 3-5.

The detailed operation of the apparatus will be described in connection with an example in which this calling party, whose number is 3—5, desires to call a party whose number is 2-6. The calling party sets the movable arm of his selector switch 67 to the second contact point and the movable arm of his selector switch 68 to the sixth contact point and lifts his handset from the hook. This sets up the delay times to be generated by the delay line 69 for acceptance of transmitted signals by the desired party only. The desired connection with the called party having been established in a manner to be described, the calling party presses his ringing key 7 or allows his blocking oscillator 10 to operate in substitution therefor. The calling party then talks into his microphone 16.

At the instant of occurrence of each pulse of the erratic pulser 11, the earliest of the three spaced samples of the calling party's speech, derived in the manner described above, is applied by way of the amplifier 66 to the right-hand end of the delay line 69; the second of the two speech samples is applied by way of the amplifier 65 and the selector switch 67 to the second tap on this delay line; and the latest speech sample is applied by way of the amplifier 64 and the switch 68 to the sixth tap on this delay line. The right-hand end of the delay line is also connected by way of a slicer 26 and an amplifier 30 to the energizing electrode of an oscillation generator 27 and directly to the frequency control electrode of the same oscillator, as described in connection with Fig. 2. Thus, the earliest speech sample, arriving by way of the amplifier 66, is applied, after only the brief delay afforded by the last half section of the delay line 69, to set the oscillator 27 in operation at a frequency which is dependent on the amplitude of this sample. The resulting short burst of frequency-modulated energy is then radiated by the antenna 31. After the lapse of a time interval $\tau_1$, which is the time for propagation of a pulse along the delay line 69 from the second tap to the right-hand end, the second speech sample, arriving by way of the amplifier 65 and the switch 67, reaches the right-hand end of the delay line 69 and is similarly applied to the oscillator 27 to generate a short burst of energy of a frequency dependent upon the amplitude of this second speech sample and to radiate it from the antenna 31. After another interval $\tau_2$, which is the time for propagation of a pulse along the delay line 69 from the sixth tap to the second, the latest of the speech samples, arriving by way of the amplifier 64 and the selector switch 68, reaches the right-hand end of the delay line 69 and causes the generation and radiation of another burst of high frequency energy of a frequency dependent on the amplitude of this speech sample.

Thus, for each pulse of the erratic pulser 11, there is radiated a group of three pulses, each of which is the envelope of a radio frequency wave whose frequency is dependent on the amplitude of a speech sample. The first pulse to be radiated contains a radio frequency proportional to the first speech sample derived, the second pulse radiated contains a radio frequency proportional to the second sample derived, and the third pulse radiated contains a radio frequency proportional to the latest sample derived; and, while the radiated pulses are separated by the time intervals $\tau_1$ and $\tau_2$, respectively, which may be unequal and of a much smaller order of duration than the sampling interval T, the three samples in question were derived at intervals which were equally spaced apart by the time 4T.

Referring to Fig. 6, the samples represented by the vertical solid lines of A represent the three samples in question. They are simultaneously selected by the gates 61, 62, and 63 under the influence of a single pulse of the erratic pulser 11 and are grouped as on line B of Fig. 6, spaced apart by intervals $\tau_1$ and $\tau_2$. The slicer 26 reduces them to a common level, as indicated on line C, for application to the energizing electrode of the oscillator 27, which then generates brief spurts of oscillatory energy of standard amplitudes, as indicated on line D of Fig. 6, the frequency of the energy spurt being in each case proportional to the amplitude of the sample which controls the frequency of the oscillator.

The pulse groups thus generated and radiated are, in effect, code pulse groups. They are directed by the directional antenna of the calling subscriber to the central repeater station 2 where, as above described in connection with Fig. 3, their average frequency $f_1$ is changed to an average frequency $f_2$, whereupon, still containing the frequency modulation imposed by the transmitter apparatus of Fig. 4, they are rebroadcast by the central repeater station to all the substations.

Each substation is provided with apparatus which may be as shown in Fig. 15. Incoming pulses are received on an antenna 32, reduced to an intermediate frequency as by a double detection radio receiver 33, and applied to the input terminals of a delay line 70 which, like all other delay lines in the system, is terminated for no reflection. This delay line is designed to provide the same delay per section as the delay line 69 of the transmitter apparatus and is similarly furnished with taps which are multipled to the contact points of selector switches **67*a* and 68*a*. The movable arms of these selector switches are mechanically coupled or ganged to the movable arms of the selector switches 67 and 68 at the transmitter. As stated above, the operation will be described in connection with the apparatus of the called party whose telephone number is 2-6. As shown on the drawing, the zero contact point of the selector switch 67*a* is connected to the No. 2 contact point, while in the switch 68*a* the zero contact point is connected to the No. 6 contact point, so that when the party's handset is on the hook 16 and the switches 67*a*, 68*a* are returned to their zero positions under the action of the restoring spring 125** the movable arms of both switches, which rest on the zero contact points, also make connection, in the one case with the No. 2 contact point, and in the other case with the No. 6 contact point.

When, now, the radiated pulse group is received and reduced to an intermediate frequency by the double detection receiver 33, it is fed into the right-hand end of the delay line 70, and the pulses travel down the line toward the left-hand end in succession. At a certain instant, the first pulse has reached the tail end of the line 70 and appears on the lead 71. At the same instant, the second pulse, delayed with respect to the first by the interval $\tau_1$, has reached the second tap with which the movable arm of the selector switch 67*a* is connected by reason of its contact with the zero contact point, so that this pulse appears on the lead 72. At the same instant, the third pulse of the group, delayed with respect to the second by the time interval $\tau_2$, appears at the sixth tap of the delay line 70, which is directly connected to the zero contact point with which the movable contact arm is in contact in its rest position, so that this pulse appears on the lead 73. Thus, the pulses, if properly spaced, appear on leads 71, 72, and 73 simultaneously. They are individually applied in intermediate frequency form to discriminators 93, 94, and 95, which convert them into pulses of different amplitudes and remove the radio frequency oscillations from within them.

The outputs of these discriminators are applied to a second delay line 96, the pulse output of the discriminator 93 which receives the earliest pulse to the left end of the delay line, the pulse output of the discriminator 94 which receives the second pulse of the group to the mid-point of this delay line and pulse output of the discriminator 95 which receives the last pulse of the group to the right-hand end of the delay line 96, which, like the other delay lines of the system, is terminated for no reflection. Furthermore, this delay line is designed to provide a delay of 4T between its left end and its mid-point and another delay of 4T between the mid-point and the right end. After traveling to the right-hand end of this delay line, these pulses are spaced apart by intervals 4T and are applied by way of an amplifier 97 to a gate 91. When the gate 91 is open and a path is established from the amplifier 97 to the condenser 49, this condenser is charged to a potential proportional to the amplitude of the first of the three samples taken at the transmitter of Fig. 4. The condenser 49 holds its charge until the application to it of another impulse, whereupon it adopts the potential determined by this new impulse. After the lapse of an interval 4T, assuming that the gate 91 is again opened, another impulse passes by the same path to the condenser 49, which is now proportional to the amplitude of the second sample. Still later after the lapse of another interval 4T, a third impulse passes to the condenser 49, whose amplitude is now proportional to the last of the three samples taken at the transmitter. The voltage on the condenser 49 is applied by way of an amplifier 38*a* to the telephone receiver 50. The delay line 96 thus operates to restore the three speech samples, which occur simultaneously on the leads 71, 72, 73, to their proper locations on the time scale. As a result, the speech delivered to the microphone 16 at the transmitter is recovered in the telephone instrument 50 at the receiver. However, these events occur only when the gate 91 is opened and path established from the amplifier 97 to the amplifier 38*a*. The manner in which this is accomplished under and only under, the correct conditions will now be described.

The three intermediate frequency pulses which simultaneously appear on leads 71, 72, and 73 are applied to rectifiers 74, 75, and 76, respectively. The pulse transmitted by rectifier 74 is applied by way of a condenser to the beam control electrode of a cathode beam tube 80 which is provided with a row of beam stopping plates, each of which is provided with a central aperture and an anode or target onto which the beam impinges if and only if it succeeds in passing through all of the apertures of the sequence. Between each pair of aperture plates, there is arranged a pair of beam-deflecting electrodes. To the lower member of the first electrode pair, the output terminal of the rectifier 74 is connected, while to the upper member of the same pair, the output of the rectifier 75 is connected. Thus, the beam which is turned on by the application of the output of the rectifier 74 to the control grid of the tube 80 is deflected to one side or to the other of the aperture in the first aperture plate if there is any difference between the outputs of rectifiers 74 and 75. Only if rectifiers 74 and 75 deliver outputs of substantially identical magnitudes will the cathode beam of the tube 80 succeed in passing through the first aperture. Similarly, the lower member of the second beam-deflecting electrode pair is connected to the rectifier 75, while the upper member of the same pair is connected to the rectifier 76. These connections permit the beam to pass through the second aperture plate when and only when the outputs of rectifiers 75 and 76 are substantially identical. As a result, it can pass both the first and the second aperture plates only when all three of the rectifier outputs are identical. This insures that only a pulse group of which the individual pulse amplitudes are alike shall succeed in opening the gate 91.

In addition, the outputs of the several rectifiers 74, 75, and 76 are connected to differentiators 77, 78, and 79, respectively, and the output of each differentiator is applied between the upper member of one of the deflection electrode pairs and ground. With these connections, if the time derivative of the pulse passing any one of the rectifiers 74, 75, or 76 is not zero, the corresponding differentiator 77, 78, or 79 delivers an output to the upper member of one of the deflection electrode pairs, and the beam is deflected so that it fails to pass through the following aperture. Only when the time derivatives of all three pulses are zero does the beam succeed in passing through all three of these apertures in succession to strike the target anode and deliver an output pulse on its load resistor.

This output pulse, when so produced, is applied to the head or left-hand end of a delay line 82 in which propagation is from left to right, the right-hand end being terminated for no reflection. Taps are arranged at equally spaced points along this delay line, the delay between taps being in both cases equal to 4T, and these taps are led through resistors 83, 84, and 85 to the grid of a triode 86 whose grid bias is so adjusted that this triode is normally conductive. Inasmuch as the pulses delivered from the target anode of the tube 80 by way of the lead 81 are negative, each pulse passing the resistors 83, 84, and 85 is likewise negative and operates to drive the tube 86 below its cut-off, whereupon its discharge is transferred to the tube 87 by the action of the common cathode resistor 88. The sudden rise in current in the tube 87 causes a high negative voltage to appear across an inductance element 89, and this in turn is applied to the grid of a tube 90, driving it below cut-off, and thus furnishing a large positive voltage on the primary winding of the output transformer of this tube and supplying a positive voltage to the control terminals of the gate 91, whose construction may be as shown in Fig. 10. Application of this control pulse to the gate 91 operates to establish the signal sample path through this gate from the amplifier 97 to the holding condenser 49 and charging the holding condenser 49 to a voltage proportional to the signal sample admitted at that instant. Immediately thereafter, closure of the gate 91 results in holding this sample and maintaining its application to the input terminals of the amplifier 38*a* until the gate 91 is opened once more, whereupon a new signal sample is placed upon the condenser 49 and held there. Thus, the delay line 82 operates to derive from the occurrence of the correct pulse group whose interpulse spacings are $\tau_1$ and $\tau_2$, a sequence of gating pulses between which the intervals are 4T, i. e., to furnish gating signals to admit the signal samples recovered by the delay line 96 into the telephone receiver 50.

When the handset is on its hook 16 the contact 18 below the hook is closed. Under this condition, when the key 7 at the transmitter terminal is depressed, or when the blocking oscillator 10 operates, the ringing signal so generated is sampled, transmitted, examined, and accepted in the manner described above for the voice signal. Application of pulses from the anode of the tube 80 by way of a rectifier 51 through a relay 52 to ground thus closes a relay contact and completes a circuit through the hook contact 18 and the telephone bell 60. The telephone bell then rings, thus calling the attention of the called party to the fact that he is wanted on the telephone. The ringing ceases as soon as he lifts his handset from its hook 16.

The apparatus of Fig. 15 is thus more completely protected from interference by unwanted pulses than is the apparatus of Fig. 14, inasmuch as it rejects all pulse groups unless they satisfy all of the following conditions:

1. The second transmitted energy spurt is spaced from the first by the correct interval $\tau_1$.
2. The third transmitted energy spurt is spaced from the second by the correct interval $\tau_2$.
3. The envelopes of these energy spurts, i. e., their rectified amplitudes as measured by the rectifiers 74, 75, and 76, are all alike.
4. The time derivative of the first pulse is zero.
5. The time derivative of the second pulse is zero.
6. The time derivative of the third pulse is zero.

Evidently, the concurrence of all of these conditions on a chance basis is an extremely remote possibility, so that the danger of cross-talk between substations is minimized.

On the other hand, should the system be heavily loaded so that interference among pulse groups of different calling parties is to be anticipated and consequent masking of one or more pulses of the desired group by an interfering pulse, each receiver accepts only the unaltered pulse groups which are suitably coded for it and rejects not only unwanted pulse groups but also rejects pulse groups destined for it when they are seriously masked by unwanted pulses. Thus as before, although more completely and with greater refinement, interference among pulses results only in degradation of the received message as distinguished from cross-talk among messages.

Fig. 5 shows the constructional details of a source of erratically spaced pulses suitable for use in connection with the invention. Here, a gas tube 100 serves as a broad-band noise source. Amplifiers 101 and 102 operate to raise the noise signal generated by the tube 100 to a high level. The noise signal is then applied to biased rectifiers 103 and 104 by way of a transformer in the form of a wave of varying amplitude whose crossings of the zero voltage axis are erratic. The biased rectifiers 103 and 104 operate to square up the leading and trailing edges of this wave and to limit its peaks. The resulting wave 106 is differentiated by any suitable differentiating network, such as a triode 107 and an inductance element 108 connected in the manner shown so as to give positive and negative pulses at the erratically positioned upward and downward axis crossings of the wave 106, as shown in the wave 109. The two rectifiers 110 and 111 then rectify and limit the wave 109 to give an output consisting only of the erratically spaced negative pulses 112.

Various other sources of erratically spaced pulses are also suitable for use in connection with the invention. The only requirement is that the average recurrence rate of these pulses shall be of the same general order of magnitude as the average rate at which the message wave is to be sampled. Thus, for example, when successive samples are taken as in Fig. 2, the average pulse interval of the erratic pulse source 11 should be equal to the sampling period T, while, when each of the erratic pulses of the source acts to take three speech samples, then its average pulse rate should be one third as great or its average time interval between the erratic pulses should be three times as great or 3T.

What is claimed is:

1. In a non-synchronous time division multiplex telephone system, a plurality of independent transmitter stations, each of said stations comprising a signal source, a source of erratically timed pulses, means for deriving samples of the signals of the signal source under control of the erratically timed pulses of said pulse source, means for generating a selected one of a plurality of distinguishable pulse groups each of which is distinguished from all of other pulse groups of said plurality by virtue of a particular value assigned to a selected characteristic of the group, which value identifies a corresponding one of a like plurality of receiver stations, means for determining the instant of said pulse group generation under control of each pulse of the erratically timed pulse source to generate a sequence of pulse groups which are alike in said characteristic, means for modulating another characteristic of each pulse group of said sequence in accordance with the amplitude of the corresponding signal sample, and means for transmitting said sequence of pulse groups as modulated.

2. In a non-synchronous time division multiplex telephone system, a plurality of independent transmitter stations, each of said stations comprising a signal source, a source of sampling pulses, means controlled by each pulse of the sampling pulse source for deriving a plurality of non-adjacent samples of the signals of the signal source between any two of which there are similarly derived at least two other samples, means for generating a selected one of a plurality of distinguishable pulse groups each of which is distinguished from all other pulse groups of said plurality by virtue of a particular value assigned to a selected characteristic of the group, which value identifies a corresponding one of a like plurality of receiver stations, means for determining the instant of said pulse group generation under control of each of the successive pulses of the sampling pulse source to generate a sequence of pulse groups which are alike in said characteristic, means for modulating a different characteristic of each pulse of said sequence in accordance with the amplitude of one signal sample of said plurality of signal samples, and means for transmitting said sequence of pulse groups as modulated.

3. In a non-synchronous time division multiplex telephone system, a plurality of independent transmitter stations, each of said stations comprising a signal source, a source of erratically timed pulses, means for deriving a sample of the signals of the signal source under control of each one of the erratically timed pulses of said pulse source, means for generating a pair of transmission pulses, means for spacing the members of said pair by a selected identifiable time interval, means for determining the generation instant of said transmission pulse pair under control of each of the successive erratically timed samples to generate an irregular sequence of like transmission pulse pairs, means for modulating a characteristic of the pulses of each pulse pair of said sequence in accordance with the amplitude of the corresponding signal sample, and means for transmitting said sequence of pulse pairs as modulated.

4. In a non-synchronous multiplex telephone transmission system, a plurality of independent transmitter stations, each of said stations comprising a signal source, a source of erratically timed pulses, means including said pulse source for deriving samples of the signal of said signal source at successive erratically timed instants, means for generating a pulse group having an alterable identifying characteristic, a path extending from said sampling means to said pulse group generating means for initiating the generation of one such pulse group under control of each of the erratically timed pulses of said pulse source, means for selectively altering said characteristic in conformity with a corresponding characteristic of receiver apparatus, and means for modulating a different characteristic of each of said pulse groups by one of said signal samples.

5. Apparatus as defined in claim 4 wherein each of the erratically timed pulses of the pulse source controls the derivation of a single signal sample and wherein all the pulses of the generated pulse group are modulated by said sample.

6. Apparatus as defined in claim 4 wherein each of the erratically timed pulses of the pulse source controls the derivation of a plurality of equally spaced but non-adjacent signal samples and controls also the generation of a group of adjacent pulses of controllable spacing, and wherein each of said generated pulses is modulated by one of said samples.

7. Apparatus as defined in claim 4 wherein the pulse group comprises a pair of pulses and wherein the alterable characteristic of said group is the time interval between the members of the pair.

8. Apparatus as defined in claim 4 wherein the pulse group comprises a preassigned number of pulses and wherein the several intervals separating said pulses are individually and selectively alterable.

9. In a non-synchronous time division multiplex telephone system, a plurality of independent transmitter stations, each of said stations comprising a signal source, a source of erratically timed pulses, a delay line having an input end and a plurality of output taps spaced along its length, a gate having conduction terminals interconnecting said signal source with the input end of said line, and having control terminals, a path extending from said pulse source to the control terminals of said gate by way of which each pulse of said source acts to establish a path through said gate for a sample of the signal of said source, a terminal selectively connectable to any one of said taps, an oscillation generator having a modulation control terminal, and paths extending individually to said modulation control terminal from the input end of said line and from said connectable terminal.

10. In a non-synchronous time division multiplex telephone system, a plurality of independent transmitter stations, each of said stations comprising a signal source, a source of sampling pulses, a first delay line having an input end and a plurality of output taps spaced along its length, a second delay line having a plurality of input taps and an output end, a gate interconnecting each output tap of the first-named line with an input tap of the second-named line, a selector switch for selecting the input tap with which at least one of said gates is connected, each of said gates being normally disabled and having a control terminal, a path extending from said sampling pulse source to each of said gates for simultaneously enabling said gates for a brief interval on the occurrence of each sampling pulse, an oscillation generator having a modulation control electrode, and a connection from the output end of said second line to said modulation control electrode.

11. Apparatus for selectively accepting a group of a preassigned number of pulses which are of like amplitudes and are separated by preassigned time intervals and for rejecting all other pulse groups which comprises a delay line having an input end and a plurality of output taps connected to a plurality of points spaced along its length, the locations of said taps being correlated with said preassigned time intervals, a conductor connected to each of a group of said taps, the number of taps in said group being equal to said preassigned number of pulses, a translating device connected to each of said conductors, each of said translating devices having an output circuit, said output circuits being connected together in balanced relation, means for deriving a first bias voltage from unbalanced outputs of said translating devices, a differentiating device also connected to each of said conductors, each of said differentiating devices having a balanced output circuit, means for deriving a second bias voltage from an unbalanced output of each of said differentiating devices, means for deriving a signal indicative of the presence of the first pulse of an incoming pulse group, means for combining all of said bias voltages in additive relation, and means for combining said derived signal with said bias voltages in opposing relation thereto, whereby said derived signal is inoperative in the presence of any one or more of said bias voltages.

12. Apparatus for selectively accepting a sequential group of a preassigned number of pulses which are of like amplitudes and are separated by preassigned time intervals and for rejecting all other pulse groups which comprises means including a delay line having a plurality of taps spaced along its length at points correlated with said time intervals and an output conductor connected to each of said taps, for converting said sequential pulse group into a simultaneous pulse group of one pulse on each of said conductors, an electron beam tube having an electron gun, a beam-control electrode, a target anode, a plurality of plates each having an aperture in the undeflected path of the beam, beam deflecting elements arranged in pairs ahead of the several plates, connections for applying one of said pulses to the beam-control electrode, connections for applying each pulse to one member of one of said deflecting element pairs, connections for applying an adjacent pulse to the opposite member of said deflecting element pair, a differentiating device connected to each of said conductors, each of said differentiating devices having an output circuit, the output circuit of each differentiating device being connected to the deflecting elements of one of the remaining deflecting element pairs, whereby the beam is directed toward said target and passes all of said apertures without deflection to strike said target only when the pulses of said group are separated by said preassigned time intervals and are alike in magnitude at their mid-points.

13. Apparatus for selectively accepting a sequential group of preassigned number of pulses which are of like amplitudes and are separated by preassigned time intervals and for rejecting all other pulse groups which comprises a plurality of conductors, means for converting said sequential pulse group into a simultaneous pulse group of one pulse on each of said conductors, an electron beam tube having an electron gun, a beam-control electrode, a target anode, a plurality of plates each having an aperture in the undeflected path of the beam, beam deflecting elements arranged in pairs ahead of the several plates, connections for applying one of said pulses to the beam-control electrode, connections for applying each pulse to one member of one of said deflecting element pairs, connections for applying an adjacent pulse to the opposite member of said deflecting element pair, a differentiating device connected to each of said conductors, each of said differentiating devices having an output circuit, the output circuit of each differentiating device being connected to the deflecting elements of one of the remaining deflecting element pairs, whereby the beam is directed toward said target and passes all of said apertures without deflection to strike said target only when the pulses of said group are separated by said preassigned time intervals and are alike in magnitude at their mid-points.

14. Apparatus for recovering a wanted group of pulses having preassigned amplitudes and which are separated by preassigned time intervals in the presence of unwanted pulse groups which comprises amplitude responsive means for generating a first signal under all amplitude conditions other than said preassigned amplitudes, time interval-responsive means for generating a second signal for all interpulse intervals other than said preassigned ones, means for individually differentiating each pulse at the instant of its occurrence and for generating a third signal related to the magnitude of the derivative of the pulse at that instant, means for combining said first, second, and third signals in additive relation, translating means for one of said pulses, and connections for applying said combined first, second and third signals to disable said translating means.

15. In a non-synchronous time division multiplex telephone transmission system, a signal source, means for deriving a group of non-adjacent samples of the signals of said source between any two of which there is similarly derived at least one other sample, means for generating a group of adjacent pulses which are selectably spaced apart in time by time intervals which are substantially smaller than the intervals separating the samples of the sample group, and means for modulating a characteristic of each pulse of the pulse group by the amplitude of one sample of the sample group.

16. Apparatus as defined in claim 15 wherein each sample of the sample group is spaced from the next sample of the sample group by a fixed interval which is at least several times as great as the average sampling interval and wherein each pulse of the pulse group is spaced from the next pulse of the same group by an interval which is equal to or less than the average sampling interval.

References Cited in the file of this patent

UNITED STATES PATENTS

| | | |
|---|---|---|
| 2,405,991 | Beverage | Aug. 20, 1946 |
| 2,408,079 | Labin et al. | Sept. 24, 1946 |
| 2,410,350 | Labin et al. | Oct. 29, 1946 |
| 2,412,974 | Deloraine | Dec. 24, 1946 |
| 2,419,525 | Alford | Apr. 29, 1947 |
| 2,425,066 | Labin et al. | Aug. 5, 1947 |
| 2,454,792 | Grieg | Nov. 30, 1948 |
| 2,471,416 | Deloraine et al. | May 31, 1949 |
| 2,530,142 | Alkins | Nov. 14, 1950 |
| 2,541,932 | Melhose | Feb. 13, 1951 |